United States Patent [19]

Collins

[11] Patent Number: 4,557,789

[45] Date of Patent: Dec. 10, 1985

[54] SPLICING APPARATUS AND CASSETTE THEREFOR

[76] Inventor: Stephen Collins, 5 Templar St., London SE5, England

[21] Appl. No.: 353,527

[22] Filed: Mar. 1, 1982

[30] Foreign Application Priority Data

Mar. 14, 1981 [GB] United Kingdom ................ 8108095

[51] Int. Cl.⁴ .................... B31F 5/00; B32B 31/04; B44C 1/00; B65H 1/00
[52] U.S. Cl. ..................... 156/505; 156/517; 156/540; 156/541; 156/545; 156/584; 221/198
[58] Field of Search ............... 156/584, 540, 591, 271, 156/254, 504, 506, 577, 152, 248, 249, 238, 344, 91, 94, DIG. 48, 517, 518, 527, 505, 545; 221/45, 46, 285, 107, 198; 206/409, 447, 411

[56] References Cited

U.S. PATENT DOCUMENTS

| | | | |
|---|---|---|---|
| 3,369,952 | 2/1968 | Rieger | 156/DIG. 48 |
| 3,533,885 | 10/1970 | Gustafson | 156/502 |
| 3,793,114 | 2/1974 | Thomas | 156/542 |
| 3,904,472 | 9/1975 | Glaus | 156/505 |
| 4,008,119 | 2/1977 | Hermann | 156/541 |
| 4,113,141 | 9/1978 | Kronfeld | 206/409 |
| 4,113,906 | 9/1978 | Brandwein | 156/249 |
| 4,129,941 | 12/1978 | Zahn | 227/138 |
| 4,259,138 | 3/1981 | Sato | 156/542 |
| 4,324,603 | 4/1982 | Crandall | 156/584 |
| 4,330,357 | 5/1982 | Collins | 156/540 |

FOREIGN PATENT DOCUMENTS 2193996 2/1974 France .
810803 3/1959 United Kingdom ....... 156/DIG. 48

Primary Examiner—Edward Kimlin
Assistant Examiner—Louis Falasco
Attorney, Agent, or Firm—Murray, Whisenhunt and Ferguson

[57] ABSTRACT

A tape slicer comprises a base with cutting plates having cooperating cutting edges. A cassette contains adhesive items mounted on a roll of carrier strip and has an arcuate and grooved recess formed in its base for receiving the sprocket wheel of the drive mechanism whereby the carrier strip passes between the base and the wheel when driven by the actuating lever via ratchet wheel. The cassette housing includes an elongate delivery passage which terminates in a curved portion carrying an edge provided to separate the adhesive items from the carrier.

16 Claims, 11 Drawing Figures

SPLICING APPARATUS AND CASSETTE THEREFOR

BACKGROUND TO THE INVENTION

This invention relates to apparatus for dispensing adhesive items typically for joining together tape-like materials and is particularly applicable but not limited to the joining of magnetic recording tape.

STATEMENT OF PRIOR ART

It is known to join magnetic recording tape by positioning the ends to be joined, which have been manually cut with a razor blade, within a longitudinally formed channel within a metal block, manually removing and cutting a length of single-sided adhesive tape from a roll of the material, manually laying the adhesive tape generally longitudinally over the recording tape ends to be joined so as to bridge them, and manually pressing the adhesive side of the tape into contact with the ends to be joined. This known method is time consuming and accordingly an apparatus for facilitating the rapid joining of tape materials has been invented and forms the subject of our EPC application No. 80302791.1 filed Aug. 13, 1980 entitled "Splicing Apparatus". The above referenced application discloses apparatus for automatically dispensing adhesive item lengths that are brought into contact with the ends of the tape materials to be joined. The apparatus is particularly useful to editors of magnetic tape (audio or video) and film.

OBJECT OF THE INVENTION

The present invention relates, inter alia, to a modification of the apparatus to receive a cassette containing adhesive items and to the cassette construction adapted to fit such apparatus.

SUMMARY OF THE INVENTION

According to the invention there is provided a cassette for dispensing adhesive items mounted on a carrier support strip said cassette consisting essentially of a housing including:
- a chamber for receiving the carrier strip in roll form;
- means defining a delivery passage of elongate section through which the carrier strip emerges during use; and
- means defining an edge adjacent the delivery passage exit against which the carrier strip can be drawn whereby the adhesive items are separated from the support carrier strip, characterized in that the housing includes a curved portion adjacent the delivery passage exit and transverse of the carrier so as to present a pressure differential to the emerging support carrier and adhesive items so as to extend and control the attitude of said items; and
- contact means provided to ensure that the carrier strip conforms to the curvature provided by said curved portion, to aid dispensing of the adhesive item on separation from said carrier strip.

According to a further aspect of the invention there is provided splicing apparatus for joining material, such as magnetic recording tape, consisting essentially of:
- a support;
- two pivotally mounted cutting plates carried by said support and having co-operating cutting edges;
- means for defining aligned grooves within said plates formed respectively transversely of the cutting edges thereof for reception of the material to be jointed at a splicing region;
- a detachable cassette for storing adhesive items supported on a support carrier strip;
- retaining means for holding said cassette in said apparatus;
- transport means for driving said carrier, said detachable cassette comprising a housing;
- a chamber provided in said cassette housing for receiving the carrier strip in roll form;
- means within said cassette housing defining a delivery passage of elongate section through which the carrier strip emerges during use;
- means integral with said housing defining an edge adjacent the cassette delivery passage exit against which the carrier strip can be drawn when driven by said transport means whereby the adhesive items are separated from the support carrier strip; and
- wherein the housing of said detachable cassette includes a curved portion adjacent the delivery passage exit, the curvature thereof being transverse of the direction of movement of said carrier strip so as to present a pressure differential to the emerging support carrier and adhesive items on separation from said carrier strip, to aid dispensing of the adhesive item directly over the splicing region.

In use the tape (e.g. magnetic tape) to be cut is placed in the groove of one plate, relative movement is effected between the two plates to cut the tape at a first position to produce two cut ends, a first cut end is retained in the groove of said one plate and moved relative to the other plate, the second cut end is placed in the groove of the other plate, relative movement between the two plates is again effected to cut the magnetic tape at a second position and to bring the ends thereof remaining in the grooves into abutting disposition for application of an adhesive joining item and on operation of actuating means cooperating with the transport means each item of adhesive material is automatically brought into alignment with each successive two ends of said magnetic tape to be joined.

Further according to the invention there is provided a cassette adapted for use in a tape splicing machine having an intermittently operable transport mechanism for dispensing adhesive items of joining material, said cassette comprising a housing, including a chamber for receiving the adhesive lengths on a carrier strip in roll form, means defining a delivery passage of elongate section through which the carrier strip emerges during use, and means defining an edge adjacent the delivery passage exit against which the carrier strip can be drawn when driven by said transport means whereby the adhesive items are separated from the carrier strip.

The carrier strip and adhesive items are formed on a continuous roll by automatically and successively cutting or stamping a plurality of lengths from an adhesive layer mounted on a continuous roll of release backing paper (carrier). The adhesive lengths are of a width that is equal to or less than the width of said material to be joined.

BRIEF DESCRIPTION OF THE DRAWINGS

The invention will now be described by way of example with reference to the accompanying drawings, in which.

DESCRIPTION OF PREFERRED EMBODIMENT

Figure 1:
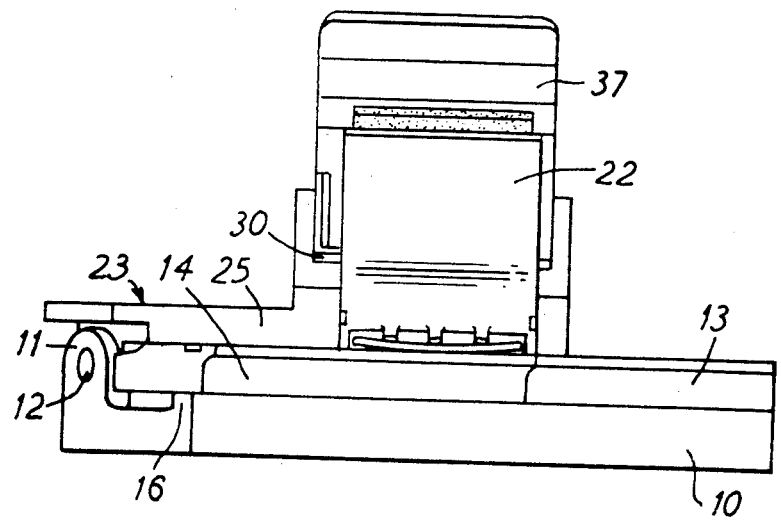
FIG. 1 is a front elevation of the splicer according to the invention.

In the arrangement shown in FIGS. 1 to 6 there is provided a base 10 of substantially right triangular configuration in plan having lugs 11 upstanding thereon carrying a shaft 12 disposed parallel to one side of the base about which shaft pivot a pair of cooperating cutting plates 13, 14. The ends of the plates 13, 14 terminate in oblique edges which are in alignment with each other and lie parallel to the hypotenuse side 15 of the base 10 at the edge of which there is provided an upstanding lip 16 to support the ends of the plates 13, 14 away from the upper surface of the base 10. A space is thereby formed between the plates 13, 14 and the base 10 through which cut pieces of tape may pass unhindered or be collected.

The two plates are urged together by a spring in the form of a compression spring 20 carried on the shaft 12. The spring ensures that the edges of the plates 13, 14 are maintained in contact and are capable of effecting a scissors like shearing action. The contacting edges of the plates may be slightly raked (0–0.002" from the front to the rear) to ensure that the leading cutting edges engage together to produce a shearing action.

The cutting edges at the front portions of the cutting plates may be eased by the removal of material along the engaging faces in the region extending from the front edges, by an amount of about 0.010" rearwardly for a short distance and downwardly from the upper surface of the cutting plates.

A groove 21 is formed in the plates 13, 14 close to the distal ends of the said plates, and parallel to the side 15, i.e. the groove is 45° to the cutting edges of the two plates. The parts 21a and 21b of the groove 21 are shaped to grip gently the magnetic tape to be spliced and are accordingly both defined in cross-section by a slightly concave bottom and sides which taper inwardly from the bottom upwardly. Apertures (not shown) may be provided as part of a vacuum operating system to assist retention of the tape.

Figure 8:
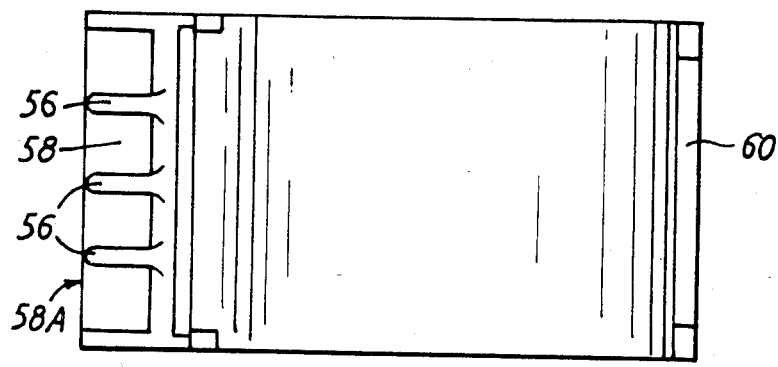
FIG. 8 is a plan view of the cassette.
Figure 9:
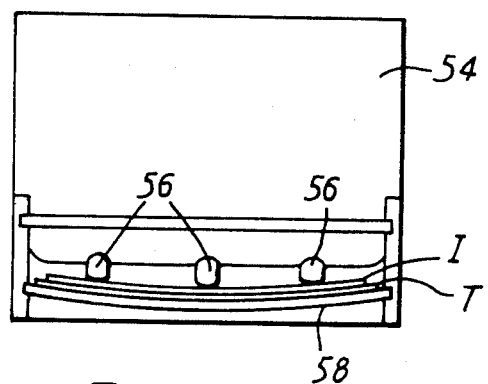
FIG. 9 is a front elevation of the cassette.

The carrier strip carrying the adhesive item lengths is provided in roll form and is housed in a cassette of the kind shown in FIGS. 7 to 9 to be described later. The cassette 22 is mounted in a support 23 which is pivoted on the shaft 12 by means of lugs 24. The support 23, which is pivotable independently of the two cutting plates 13, 14 comprises a plate portion 25 which normally lies over the cutting plates 13, 14 and parallel thereto. A cassette holder comprises a first side plate 26 integral with an edge of said support 23 normal to the front face 15, a second side plate 27 parallel to the first and attached integrally therewith by a curved carrier strip guide member 28. The upper rearward edge 29 of the latter is serrated to facilitate severing from time to time of the used carrier strip.

The cassette support 23 carries the transport means for the strip, which means comprises a sprocket wheel 30 having a spindle 31 rotatable mounted in bearing holes in the two side plates 26, 27 and a pawl 32 and ratchet wheel 33. The ratchet wheel 33 is secured to the sprocket wheel 30 at one end thereof and is also carried by the spindle 31. An actuating lever 34 comprises a pair of arms 35, 36 and a cross piece 37 joining the two arms. The actuating lever is pivoted on two stub shafts 38, 39 engaging in further bearing holes provided in the side plates 26, 27 towards the rear thereof.

The pawl 32 is pivotally mounted by a pin 40 on the arm 35 at a region of reduced thickness of the latter. The pawl is likewise provided with a region of reduced thickness whereby in plan view the pawl lies within the width of the arm (see FIG. 6). The pawl 32 bears against an abutment 41 provided on the inside surface of side plate 26 (or alternatively locate in a recess therein).

A torsion spring 46 is formed with one arm having a bent over end 47 which engages the sprocket wheel, a coil portion 48 and a second arm of which the end is bent over 49 and engages a small bore in the side of the pawl 32. The spring serves three purposes, namely as a return spring for the pawl, a return spring for the actuating lever 34 and as an arresting element for the sprocket wheel.

To the cross piece 37 is mounted by means of adhesive a foamed plastic applicator pad 42 which is tapered along one edge 43. The pad is so shaped that on effecting a downward swinging movement of the actuating lever 34 to bring the pad into the groove 21 (see FIG. 3), first the narrow edge 44 engages along one side of the bottom of the groove followed on continued applied pressure by the tapered surface 43 which gradually engages the remainder of the bottom of the groove on deformation of the pad.

Figure 7:
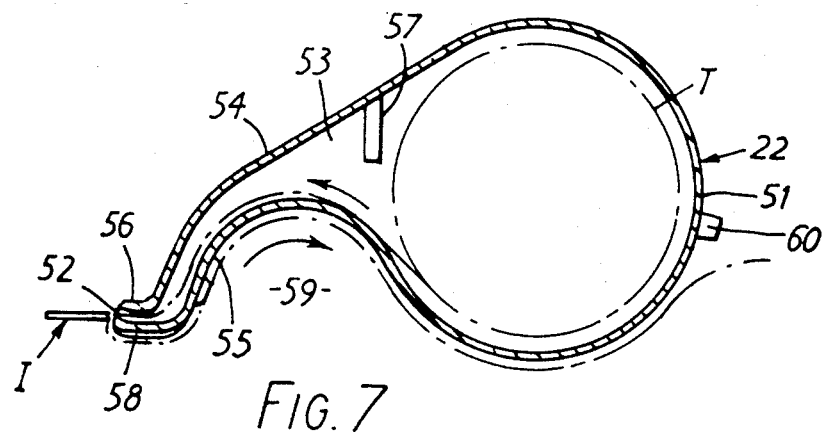
FIG. 7 is a section of the cassette illustrated in FIG. 8, showing the strip in chain lines.

The cassette 22 (see FIGS. 7 to 9) comprises a substantially cylindrical chamber 51 closed at the ends for receiving a roll of carrier strip T shown in chain lines in FIG. 7. The chamber communicates with a delivery passage 52 by way of a tapered portion 53 defined at the upper side by a wall 54 and a part cylindrical wall 55 at the underside. The recess 59 formed by the wall 55 has a radius of which the centre lies on the axis of the pin 31. The recess is dimensioned so as to accommodate about half of the sprocket wheel 30 and permit sufficient space for the passage of the strip T. The underside of the wall 55 is provided with arcuate grooves to deform the carrier strip to accommodate the sprocket teeth as they rotate.

The delivery passage 52 is elongate in section and of sufficient width and height to guide the strip as it is withdrawn from the cassette. Wall 54 carries a crosspiece 57 provided to reduce rucking of the strip as it is withdrawn from chamber 51.

The wall 55, where it extends towards the exit of the delivery passage 52, is formed into a portion 58 (see FIG. 9) which is slightly convex relative to the exterior base of the cassette. This curvature gives rise to an interior concave surface which is presented to the strip as it emerges from the cassette. The adhesive items I carried on the upper surface of the waxed strip T are held against this surface by means of three spring fingers 56 whereby the strip is deformed to this shape and emerges parallel to the surface of portion 58. As the tape moves under and rearwards of the cassette (see FIG. 7) the deformation and radiused edge 58A presents pressure differences to the adhesive items and carrier strip such that item I is urged from the carrier strip T and ejected forwards whilst the strip moves rearwards. The provision of this feature ensures effective separation from the backing tape. The radiused edge 58A (e.g. 1 mm or less) aids separation of the adhesive items from the carrier strip. The deformed portion 58 is curved (e.g. 100 mm radius) in order to ensure anti-gravitational cross-tension over the adhesive item so that it remains parallel to the edge 58A although moved beyond it. It is thus extended without recourse to guides, rollers or other forms of support which might hinder vertical placement of the item.

The cassette including the spring fingers is preferably made from a plastics material which during moulding is formed with location members which will temporarily deform as the cassette is inserted into the cassette support. The location member 60 engages under two projections 61 extending inwardly from the side plates 26, 27. At the front end the forwardly projecting portion 62 of the sides of the cassette engage under further projections 63 formed on the side plates 26, 27.

In use, a splicing operation may be carried out by first pivoting the plate 14 and the plate portion 25 to a substantially vertical position. The magnetic tape to be edited is placed oxide downwardly in the groove 21a with a first selected marked point at which the cut is to be made aligned with the cutting edge of the plate 13. The plate 14 is lowered and shearing of the tape takes place. The plate 13 is then raised carrying with it the first of the cut ends of the tape. The second cut end of the tape is withdrawn from beneath the plate 14 and placed in the groove 21b in the plate 14 with a second selected marked point aligned with the cutting edge of the plate 14. The plate 13 will now be brought down firmly by the user to effect the second cut. When the plate arrives in its lowermost rest position the first of the cut ends will exactly align with the remaining part of the second cut end i.e. laterally, vertically and with the 45° cut surfaces abutting each other.

The actuating lever 34 is now depressed whereby the pawl 32 engages a tooth of the ratchet wheel 33 thus driving the latter in the direction of the arrow. The sprocket wheel 30 is also rotated so that the strip T is pulled by engagement of the sprocket teeth with the slits therein and the strip is withdrawn from the cassette over the edge (radius about 1 mm) of the concave/convex surface of portion 58. An adhesive item is thus peeled off the carrier strip and is disposed momentarily over the region of the adjacent cut ends of the magnetic tape. Further depression of the actuating lever causes the pad 42 to press the detached adhesive item over the cut ends of the magnetic tape.

In an alternative operation the magnetic tape may be spliced by first raising the support portion 25 and the cutting plate 13, placing the magnetic tape in the groove part 21b, lowering the plate 13 to effect cutting, raising the plate 14 with the magnetic tape and squeezing the actuating lever 34 and the plate 14 between finger and thumb to apply an adhesive item to the cut end of the magnetic tape, placing the other part of the magnetic tape into the groove part 21a, and finally lowering the plate 14 so as to effect simultaneously the second cutting step and the application of the adhesive item to the second cut end to complete the splice.

Figure 5:
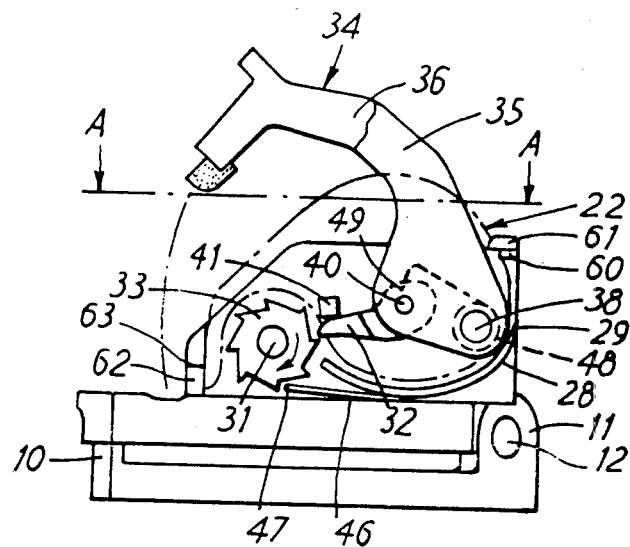
FIG. 5 is a side elevation having parts omitted to show the ratchet drive mechanism and the cassette in chain lines.
Figure 6:
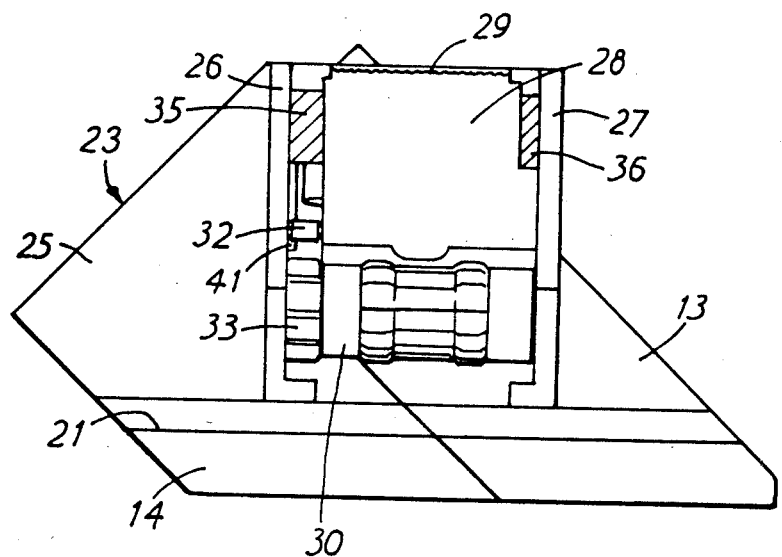
FIG. 6 is a plan view taken along the line A—A in FIG. 5.

To ensure positive indexing of the step-by-step movement of the carrier strip the latter is preformed as shown in FIG. 5 of EPC application no. 80302791.1. The lengths of adhesive material (preferably 25.4 mm long by 6 mm wide) are formed by passing a waxed carrier strip, having an adhesive plastic layer thereon, through a cutter which severs the adhesive layer along transverse lines entirely through the plastic layer. The cutter is so shaped that coincident with the lines two slits are provided in the carrier strip. The slits are spaced apart at a distance equal to the spacing of the two series of sprocket pins on the sprocket wheel. The sprocket can engage the slits during transport of the carrier strip thus preventing slip.

Whilst the tape cutting angle of 45° is often preferred it should be noted that the invention may be adapted for any angle of cut. Normally the convenient angle of cut would lie in the range of 30° to 90° to the longitudinal axis of the tape.

Figure 10:
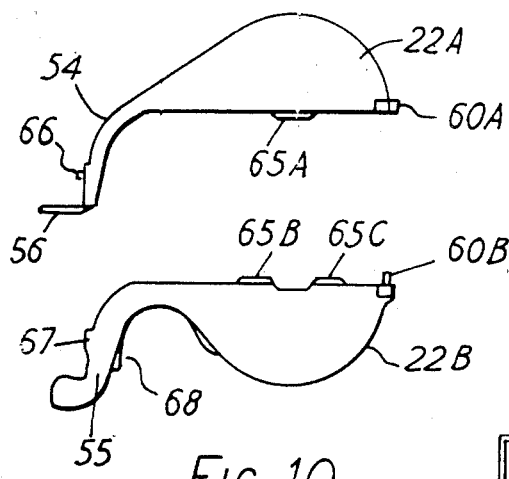
FIG. 10 shows a side elevation of an embodiment of the cassette comprising upper and lower interlocking portions.
Figure 11:
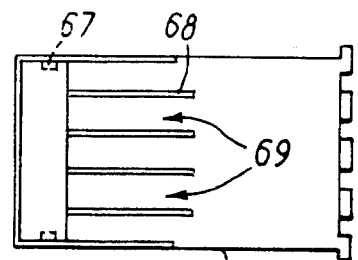
FIG. 11 shows the underside of the cassette carrying the grooves associated with the drive of the carrier strip.

The cassette 22 may be fabricated from two interlocking portions 22A, 22B as shown in FIG. 10. After insertion of the spool of tape the upper portion 22A can be lowered so that the sides of portion 54 slide between lugs 67 located on wall 55. Lugs 65A-C act as guides for the two portions and tend to resist sideways deformation of the cassette chamber. Location member portion 60B can locate within apertures in portion 60A and lug 66 can spring back to locate under lug 67 to terminate the interlocking operation to prevent re-opening of the cassette so avoiding tampering with its contents. As shown in FIG. 11, rib-like webs 68 are provided so as to define apertures 69 therebetween for receiving the sprocket teeth of wheel 30 as described above, to form part of the drive and guide mechanism for the carrier strip. The ribs deform the carrier strip over the sprocket teeth in order to facilitate their location into the carrier strip slots.

Figure 2:
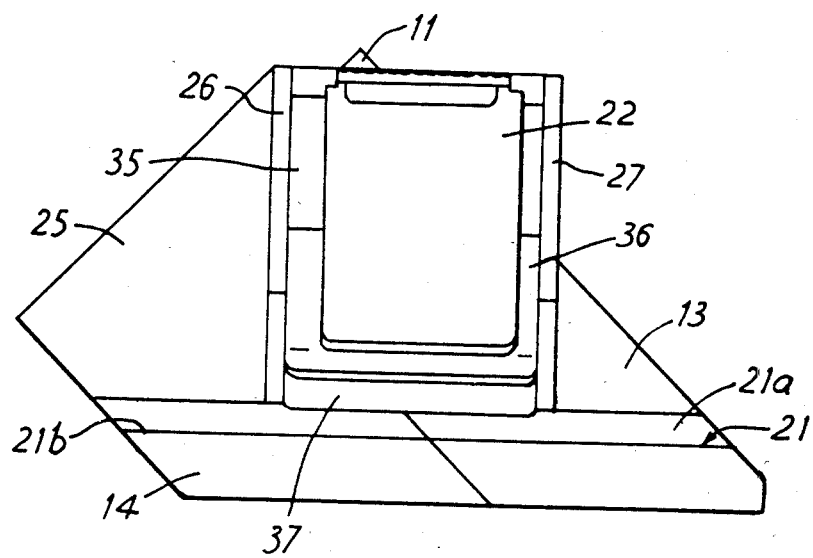
FIG. 2 is a plan view.
Figure 3:
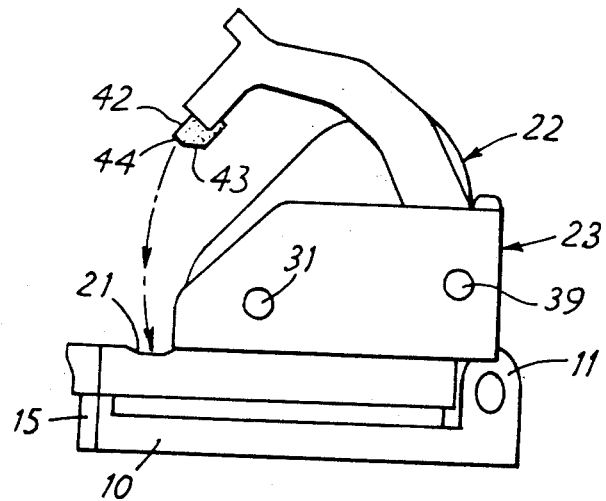
FIG. 3 is a side elevation.
Figure 4:
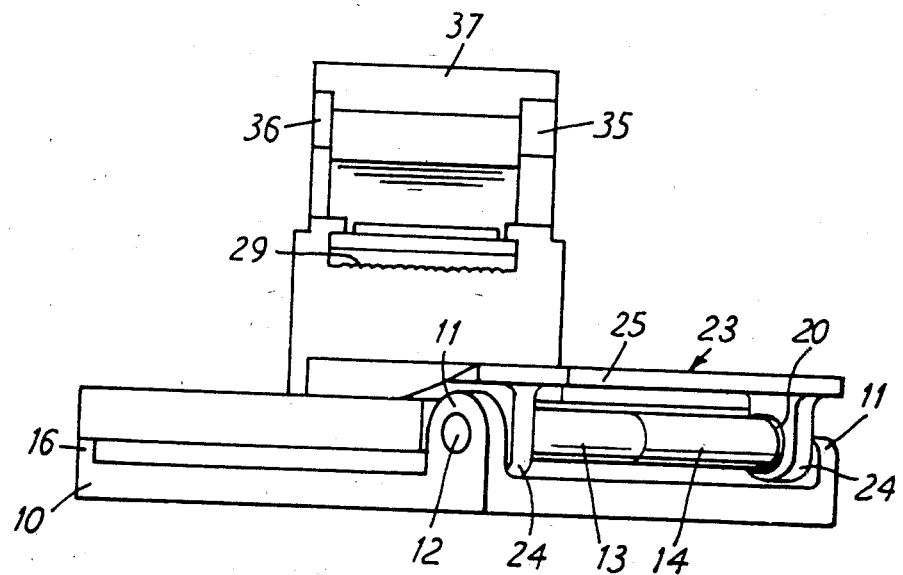
FIG. 4 is a rear elevation.
Figure 12:
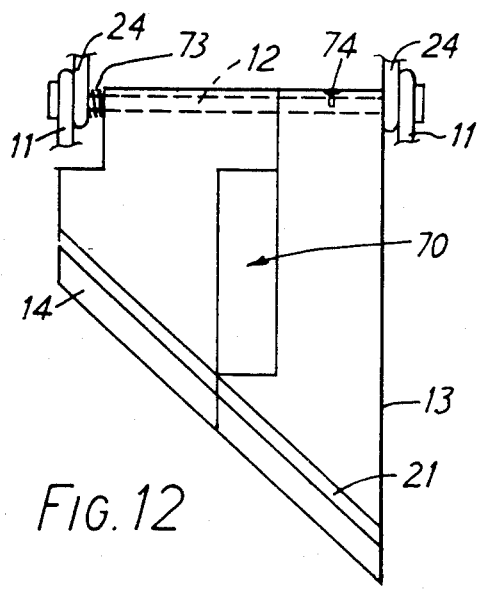
FIG. 12 shows a detail of an alternative cutting plate configuration.

The portion of the apparatus associated with the cutting plates 13, 14 of FIG. 2 can be modified as illustrated in FIG. 12. The plates 13 and 14 have been modified to provide an aperture 70 therebetween to reduce friction therebetween and ease operation. The plates are urged together by the spring 73 (here shown as a helical spring). The plate 13 remote from the spring is fixed by means of pin 74 to shaft 12, so that the shaft rotates as this latter plate is raised or lowered which overcomes the tendency for plate 13 to fall under its own weight rather than under manual control. Plate 14 is not pinned and can be recessed as shown to allow accomodation of the shaft portion carrying the helical spring 73.

Figure 13:
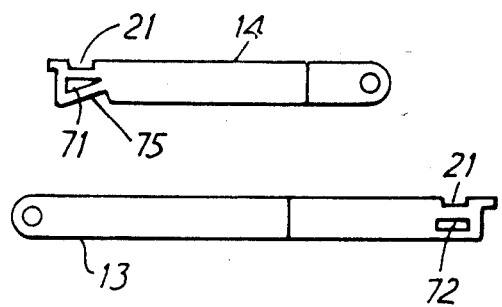
FIG. 13 shows the inner (abutting) surfaces of the plates of FIG. 12.

The inner (abutting) faces of plates 13 and 14 are shown in FIG. 13 and it can be seen that plate 14 has been modified to include profile 75 which is shaped to provide a cutting operation from front to back, whilst the other plate 13 retains the back to front cutting operation of the tape as this plate is lowered. Providing opposite cutting directions helps reduce the alignment error of the cut tape although other configurations which increase cutting efficiency can be used. As shown, sharpening pits 71 and 72 may be provided to ensure a self-sharpening operation of the cutter plates.

Although the embodiments have been described for dispensing adhesive items for use in magnetic tape splicing, the adhesive items disposed could be used elsewhere.

I claim:

1. A cassette for dispensing adhesive items mounted on a carrier support strip said cassette consisting essentially of a housing including:
    a chamber for receiving the carrier strip in roll form;
    means defining a delivery passage of elongate section through which the carrier strip emerges during use; and
    means defining an edge adjacent the delivery passage exit against which the carrier strip can be drawn whereby the adhesive items are separated from the support carrier strip, characterized in that the housing includes a curved portion adjacent the delivery passage exit and transverse of the carrier so as to present a pressure differential to the emerging support carrier and adhesive items so as to extend and control disposition of said items; and
    contact means provided to ensure that the carrier strip conforms to a curvature provided by said curved portion, to aid dispensing of the adhesive item on separation from said carrier strip.

2. A cassette according to claim 1, wherein the contact means comprises a plurality of contact fingers extending away from the exit.

3. A cassette according to claim 1, wherein the housing includes a region between the delivery passage and the chamber defining an arcuate recess for receiving a drive roller of said transport means so as to allow the support carrier strip to be drawn therebetween.

4. A cassette according to claim 3, wherein the arcuate region of said housing includes means defining at least one groove for deforming the carrier strip so as to receive sprocket teeth provided on the drive roller.

5. A cassette according to claim 4, wherein the means defining the at least one groove comprises a plurality of arcuate ribs.

6. A cassette according to claim 1, wherein the housing includes first and second interlocking portions to allow insertion of the rolled carrier strip prior to assembly of the cassette.

7. A cassette according to claim 6, wherein the housing includes at least one lug in the first portion adapted to interlock with a cooperating member in the second portion to prevent reopening of the cassette after assembly.

8. Splicing apparatus for joining material, such as magnetic recording tape, consisting essentially of:
    a support;
    two pivotally mounted cutting plates carried by said support and having co-operating cutting edges;
    means for defining aligned grooves within said plates formed respectively transversely of the cutting edges thereof for reception of the material to be jointed at a splicing region;
    a detachable cassette for storing adhesive items supported on a support carrier strip;
    retaining means for holding said cassette in said apparatus;
    transport means for driving said carrier, said detachable cassette comprising a housing;
    a chamber provided in said cassette housing for receiving the carrier strip in roll form;
    means within said cassette housing defining a delivery passage of elongate section through which the carrier strip emerges during use;
    means integral with said housing defining an edge adjacent the cassette delivery passage exit against which the carrier strip can be drawn when driven by said transport means whereby the adhesive items are separated from the support carrier strip; and
    wherein the housing of said detachable cassette includes a curved portion adjacent the delivery passage exit, a curvature thereof being transverse of the direction of movement of said carrier strip so as to present a pressure differential to the emerging support carrier and adhesive items on separation from said carrier strip, to aid dispensing of the adhesive item directly over the splicing region.

9. Apparatus according to claim 8, wherein the housing includes contact means provided to ensure that the carrier strip conforms to the curvature provided by said curved portion.

10. Apparatus according to claim 9, wherein the contact means comprises a plurality of contact fingers extending away from the exit.

11. Apparatus according to claim 8, wherein the transport means includes a drive roller and the cassette housing includes a region between the delivery passage and the chamber defining an arcuate recess for receiving the drive roller so as to draw the support carrier strip therebetween.

12. Apparatus according to claim 11, wherein the drive roller includes at least one transport sprocket and the arcuate region includes means defining at least one groove for deforming the carrier strip for receiving the sprocket teeth.

13. Apparatus according to claim 12, wherein the means defining the at least one groove comprises a plurality of arcuate ribs.

14. Apparatus according to claim 8, wherein at least one of said cutting plates includes a profile adapted to allow the plate to effect cutting of the material in a direction opposite to that of the other of said plates to reduce alignment errors.

15. Apparatus according to claim 8, wherein at least one of said cutting plates is adapted to provide an aperture between said plates to reduce friction therebetween.

16. Apparatus according to claim 8, wherein at least one of said cutting plates includes sharpening means to provide a self-sharpening facility for said blades.

* * * * *